United States Patent
Prakash

(10) Patent No.: US 11,551,722 B2
(45) Date of Patent: Jan. 10, 2023

(54) METHOD AND APPARATUS FOR INTERACTIVE REASSIGNMENT OF CHARACTER NAMES IN A VIDEO DEVICE

(71) Applicant: SLING MEDIA PVT LTD, Bangaluru (IN)

(72) Inventor: Sriram Prakash, Bangalore (IN)

(73) Assignee: DISH Network Technologies India Private Limited

( * ) Notice: Subject to any disclaimer, the term of this patent is extended or adjusted under 35 U.S.C. 154(b) by 2 days.

(21) Appl. No.: 16/744,229

(22) Filed: Jan. 16, 2020

(65) Prior Publication Data

US 2021/0225407 A1 Jul. 22, 2021

(51) Int. Cl.
*G11B 27/036* (2006.01)
*H04N 21/81* (2011.01)
*G11B 27/034* (2006.01)
*H04N 21/422* (2011.01)
*G10L 15/22* (2006.01)

(52) U.S. Cl.
CPC .......... *G11B 27/036* (2013.01); *G10L 15/22* (2013.01); *G11B 27/034* (2013.01); *H04N 21/42203* (2013.01); *H04N 21/8106* (2013.01)

(58) Field of Classification Search
None
See application file for complete search history.

(56) References Cited

U.S. PATENT DOCUMENTS

| 8,913,188 B2* | 12/2014 | Ayoub | H04N 5/44513 348/468 |
|---|---|---|---|
| 2001/0019657 A1* | 9/2001 | McGrath | H04N 21/8455 386/331 |
| 2003/0084457 A1* | 5/2003 | Lee | H04N 21/2668 725/117 |
| 2008/0218632 A1* | 9/2008 | Jung | G11B 27/11 348/468 |
| 2008/0262841 A1* | 10/2008 | Miyamoto | H04N 21/2353 704/251 |
| 2010/0118189 A1* | 5/2010 | Ayoub | H04N 21/47 348/468 |
| 2010/0299137 A1* | 11/2010 | Abe | G10L 25/48 704/9 |
| 2013/0231930 A1* | 9/2013 | Sanso | G10L 15/26 704/235 |
| 2015/0332732 A1* | 11/2015 | Gilson | G11B 27/036 386/240 |

* cited by examiner

*Primary Examiner* — Gelek W Topgyal
(74) *Attorney, Agent, or Firm* — KW Law, LLP

(57) ABSTRACT

Systems and processes are provided for interactive reassignment of character names in an audio video program including a tuner configured for receiving and demodulating a video signal to extract the audio video program, a user input operative to receive a user request to substitute an original character name within the audio video program with an alternative character name, a memory configured to buffer the audio video program to generate a delayed audio video program, a processor configured to detect the original character name within the audio video program and to replace the original character name with the alternative character name within the delayed audio video program to generate a modified audio video program, and a loudspeaker configured to reproduce the alternative character name in response to the modified audio video program.

20 Claims, 5 Drawing Sheets

METHOD AND APPARATUS FOR INTERACTIVE REASSIGNMENT OF CHARACTER NAMES IN A VIDEO DEVICE

TECHNICAL FIELD

The following discussion generally relates to real time editing of audio video programming on an electronic device. More particularly, the following discussion relates to receiving a user input from a user indicative of an alternate character name in an audio video program. The system and method are then operative to replace the original character name with the alternate character name during playback of the audio video program to the user.

BACKGROUND

The real time presentation of audio video programs, such as via broadcast television, has been an entertainment staple for the better part of a century. Early television broadcast stations transmitted programing during only a portion of the 24 day, often ceasing transmission during the overnight hours, and the received programming was immediately displayed to the viewer without opportunity to customize the home viewing experience. Currently, audio video programming may be received via over the air broadcast, cable networks, satellite retransmission, streaming via the internet or other network connection, or may be delivered via a media storage device, such as a digital video disk, or video tape.

In some instances, broadcast audio video content may be edited by a broadcast before transmission. For example, expletives may be muted or edited before transmission so they are not presented to viewers during playback on the user device, such as a television or set top box. However, during playback of a received audio video program, user may wish to edit content within the audio video program to suit their individual tastes or requirements before the content is presented. To overcome these problems, it would be desirable to facilitate a viewer desire to substitute original content with preferred content at the display device. Other desirable features and characteristics will become apparent from the subsequent detailed description and the appended claims, taken in conjunction with the accompanying drawings and this background section.

BRIEF SUMMARY

Disclosed herein are human machine interface methods and systems and related circuitry for provisioning computational systems, methods for making and methods for operating such systems, and system equipped with onboard control systems. By way of example, and not limitation, presented are various embodiments of character name substitution during playback of an audio video program in a video device are disclosed herein.

In accordance with an aspect of the disclosure, a method including receiving an audio video program, receiving a request to substitute an original character name within the audio video program with an alternative character name, delaying the audio video program to generate a delayed audio video program, detecting an utterance of the original character name within the audio video program, replacing the utterance of the original character name in the delayed audio video program with an utterance of the alternative character name to generate a modified delayed audio video program, and coupling the modified delayed audio video program to a display and loudspeaker.

In accordance with another aspect of the disclosure the utterance of the alternative character name is computer generated in response to a text user input indicative of the alternative character name.

In accordance with another aspect of the disclosure where the request to substitute an original character name within the audio video program with the alternative character name is generated in response to a user request generated via a user interface.

In accordance with another aspect of the disclosure wherein the utterance of the original character name is detected in response to a speech recognition algorithm.

In accordance with another aspect of the disclosure wherein where the request to substitute an original character name within the audio video program with the alternative character name is generated in response to a user utterance of the original character name and the alternative character name and wherein the user utterance of the original character name is used to detect the original character name in the audio video program and the user utterance of the alternative character name is used to replace an audio of the original character name in the delayed audio video program.

In accordance with another aspect of the disclosure where detecting an utterance of the original character name further includes determining a program time location corresponding to the utterance of the original character name in the audio video program and where the program time location is used replace the original character name in the delayed audio video program with the alternate character name.

In accordance with another aspect of the disclosure wherein the request to substitute the original character name within the audio video program with the alternative character name is received in response to a user selection in a graphical user interface displayed on the display.

In accordance with another aspect of the disclosure wherein replacing the utterance of the original character name in the delayed audio video program with the utterance of the alternative character name includes adjusting a time duration of the alternative character name to match a time duration of the original character name.

In accordance with another aspect of the disclosure, an apparatus including an input configured to receive an audio video program, a display device configured to display a video portion of the audio video program and a speaker to play an audio portion of the audio video program, a buffer for generating a delayed audio video program in response the audio video program, a processor operative to receive a request to substitute an original character name in the audio video program with an alternative character name, the processor being further operative to detect an utterance of the original character name within the audio video program and to replace the original character name in the delayed audio video program with the alternative character name to generate a modified delayed audio video program in response to detecting the original character name within the audio video program and to couple and to couple the modified delayed audio video program to the display device.

In accordance with another aspect of the disclosure a network interface for receiving a metadata associated with the audio video program.

In accordance with another aspect of the disclosure wherein the buffer is a memory configured to store a portion of the audio video program.

In accordance with another aspect of the disclosure a user input for receiving a user indication of the original character name and an alternative character name.

In accordance with another aspect of the disclosure wherein the processor is further operative to generate a graphical user interface having a list of character names associated with the audio video program and an input for receiving an alternate character name in response to a user input.

In accordance with another aspect of the disclosure a microphone for receiving a user indication of the original character name and an alternative character name.

In accordance with another aspect of the disclosure wherein the processor is configured to detect the utterance of the original character name in response to a closed captioning information associated with the audio video program.

In accordance with another aspect of the disclosure wherein the audio video program further includes metadata related to a character associated with the audio video program and wherein the processor is configured to detect the utterance of the original character name in response to the metadata associated with the audio video program.

In accordance with another aspect of the disclosure wherein the utterance of the original character name is detected in response to a speech recognition algorithm.

In accordance with another aspect of the disclosure wherein the audio video program further includes a closed captioning information and wherein the utterance of the original character name is detected in response to the closed captioning.

In accordance with another aspect of the disclosure, an apparatus for interactive reassignment of character names in an audio video program including a tuner configured for receiving and demodulating a video signal to extract the audio video program, a user input operative to receive a user request to substitute an original character name within the audio video program with an alternative character name, a memory configured to buffer the audio video program to generate a delayed audio video program, a processor configured to detect the original character name within the audio video program and to replace the original character name with the alternative character name within the delayed audio video program to generate a modified audio video program, and a loudspeaker configured to reproduce the alternative character name in response to the modified audio video program.

In accordance with another aspect of the disclosure wherein the processor is further operative to perform detect the original character name in response to metadata received with the video signal.

The above advantage and other advantages and features of the present disclosure will be apparent from the following detailed description of the preferred embodiments when taken in connection with the accompanying drawings.

BRIEF DESCRIPTION OF THE DRAWING FIGURES

The exemplary embodiments will hereinafter be described in conjunction with the following drawing figures, wherein like numerals denote like elements, and wherein.

The exemplifications set out herein illustrate preferred embodiments of the disclosure, and such exemplifications are not to be construed as limiting the scope of the disclosure in any manner.

DETAILED DESCRIPTION

The following detailed description is intended to provide various examples, but it is not intended to limit the disclosure or the application and uses of the disclosure. Furthermore, there is no intention to be bound by any theory presented in the preceding background or the following detailed description.

The general concepts described herein may be implemented in any audio video display device or connected device that may be used for audio video streaming or presentation to an audio video display device the like. For convenience of illustration, the following discussion often refers to a video signal processing device, such as a television, operative to receive audio video content and to display the audio video content on a display, such as a liquid crystal display (LCD) to a view. The actions taken in response to the presentation and alternation of audio video content for display to a viewer may also be associated with the functionality of the mobile phones, portable electronic entertainment devices, and any other electronic media device capable of image or video display and/or playback. Additional details and examples are provided in the following description.

Figure 1:
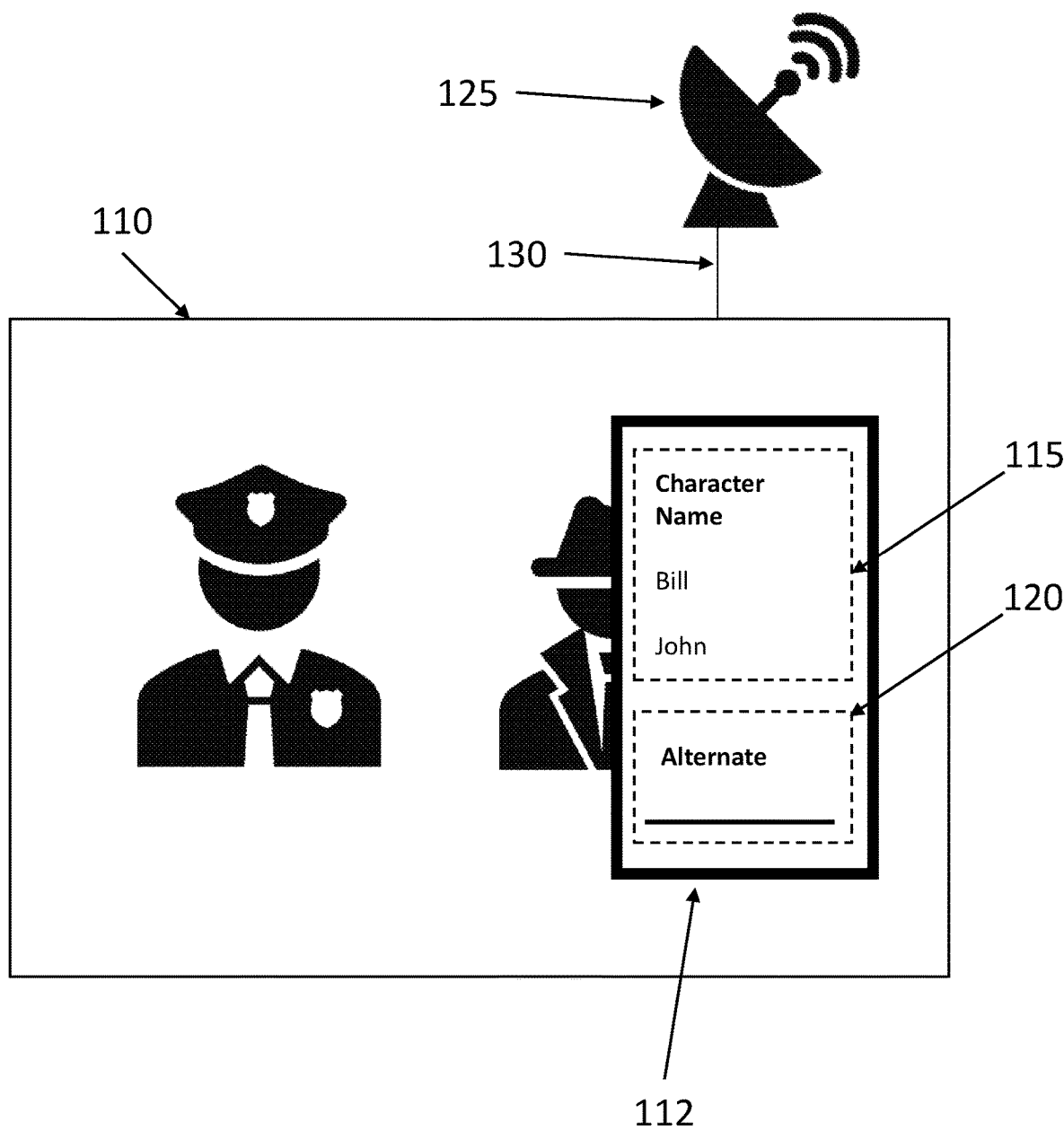
FIG. 1 shows an environment for interactive reassignment of character names in a video device according to an exemplary embodiment of the present disclosure.

Turning now to FIG. 1, an environment for a system 100 for interactive reassignment of character names in a video device according to an exemplary embodiment of the present disclosure is shown. The exemplary system 100 may include a television 110 for presenting an audio video program, a menu 112 for presenting a list 115 of original character names and an input 120 for receiving an alternate character name. According to an exemplary embodiment, the television 110 may be operative for receiving, decoding and displaying an audio video program and displaying the audio video program to a viewer.

In this exemplary embodiment, the television no is operative to receive an audio video program via an antenna 125 or the like. In one example, the antenna 125 may be operative to receive microwave satellite transmission including the audio video program and may include a low noise block amplifier and or decoding/demodulation circuitry and/or componentry. The antenna 125 may couple the received audio video program via a cable 130, or the like, to the television no. In one exemplary embodiment, the audio video program may be coupled from the antenna 125 to a set top box (not shown) for additional processing before a processed audio video program is coupled from the set top box to the television no. In one exemplary embodiment, the audio video program may further include metadata or the like including information related to the audio video program, such as description, title, run time, character names, geographical locations, etc.

Further in this exemplary embodiment, the television 110 may include circuitry, processors, or the like, to enable a graphical user interface 112 to be displayed on the television 11o. The graphical user interface 112 may be enabled to allow a user to reassign an original character name within the audio video program with an alternate character name. For example, the television 110 may be operative to receive a control signal from a user input device, such as a remote control, indicating a user desire to activate the graphical user interface 112. The television 110 may then display the graphical user interface 112 in response to the control signal.

The graphical user interface 112 may be operative to display character names from a currently displayed audio video program in a first portion of the graphical user interface 115. The character names may be extracted from metadata received with the audio video program, may be received via a network, such as the internet, in response to a request from the television no, or may be collected from closed captioning information associated with the audio video program. For example, the television no, or a processor or circuitry therein, may monitor and compare the closed captioning information for character names, such as Bill or John. The television no may then compile a list of names recognized within the closed captioning information and display these names as part of the first portion of the graphical user interface 115.

The television no may then be operative to receive a selection of one of the displayed character names in response to a user selection. The television no is then operative to provide a second portion of the graphical user interface 120 to receive a user entry of an alternate character name. The alternate character name may be selected in response to inputs on a graphical keyboard, a list of alternative names, microphone, etc.

In response to the selection of the alternate character name, the television no is then operative to replace a portion of the audio of the audio video program containing the selected character name with an alternate audio include the alternate character name. For example, the television no may be operative to buffer a first version of the audio video program in response to activation of the alternate character name algorithm, to search an unbuffered version of the audio of the audio video program to detect the original character name, to replace the original character name, or audio uttering the original character name, with the alternate character name in the buffered version of the audio video program to generate a modified delayed audio program. The television no may then be operative to play the modified delayed audio program to a viewer of the audio video program. In one exemplary embodiment, occurrences of the original character name may be detected by examining the closed captioning information associated with the unbuffered audio video program.

Figure 2:
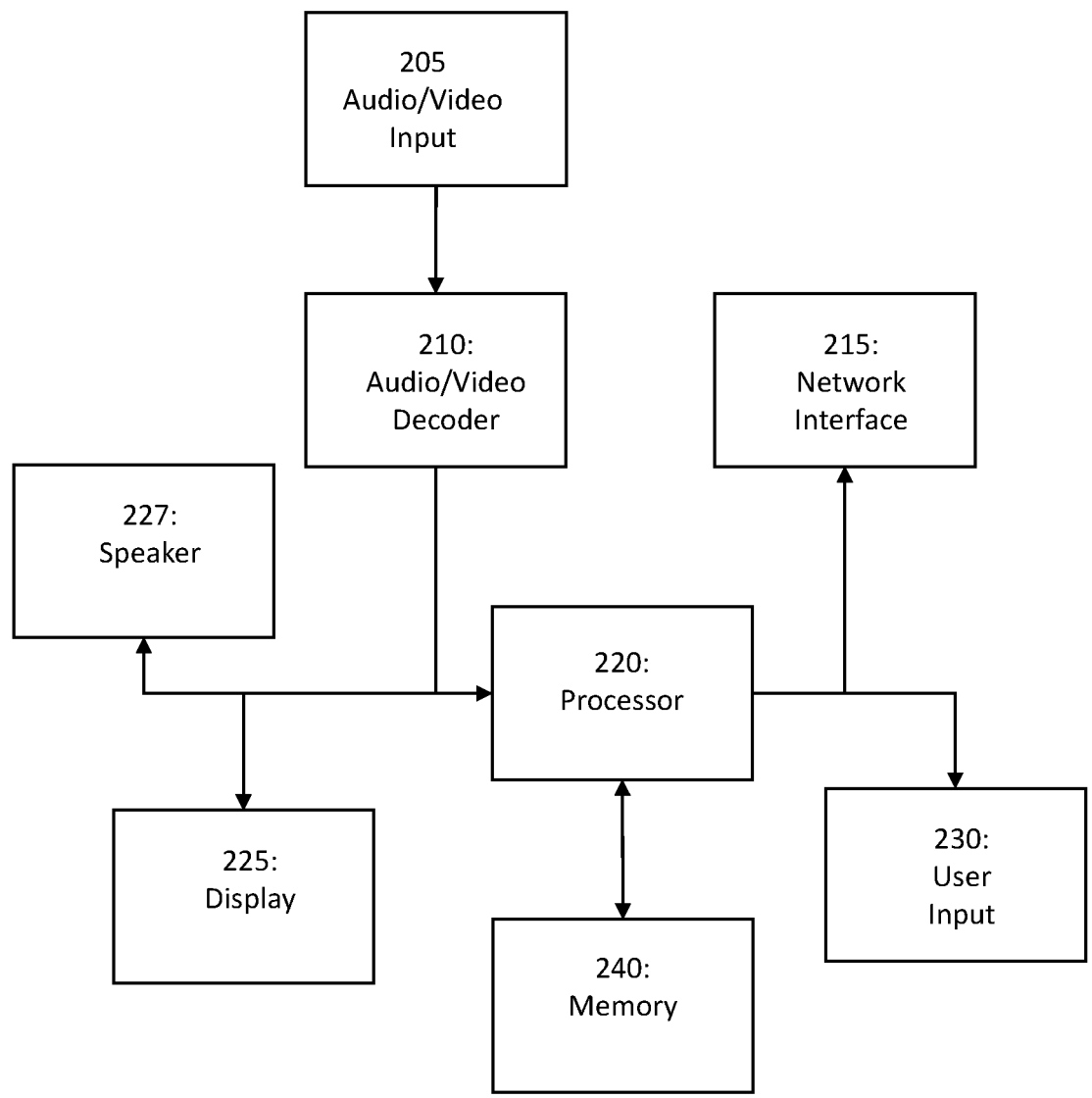
FIG. 2 shows a block diagram illustrating a system for interactive reassignment of character names for a video device according to an exemplary embodiment of the present disclosure.

Turning now to FIG. 2, a system 200 for interactive reassignment of character names in a video device according to an exemplary embodiment of the present disclosure is shown. The system 200 may include an audio/video input 205, an audio/video decoder 210, a processor 220, a network interface 215, user input 230, display 225, and a memory 240. The audio/video input 205 is operative to receive an audio-visual program. The audio/video input 205 may include a radio frequency or microwave tuner operative to receive a data representative of an audio video program modulated on a radio frequency or microwave carrier signal. Alternatively, the audio/video input 205 may be a network interface operative to receive data formatted for network transport, such as TCP/IP and to extract the audio video program from the transport packets. The audio/video input 205 may be a cable television tuner, or the like, operative to receive an ATSC, NTSC, or quadrature amplitude modulated (QAM) signal for transporting the audio video program. In an exemplary embodiment, the signal may be received via a cable television network, or satellite television network, or antenna based network.

The audio/video decoder 210 may be operative to receive the signal from the audio/video input 205 and to decode the signal to generate an audio video signal in a format suitable for the processor 220. For example, the audio/video decoder 210 may be operative to demodulate the signal from the audio/video input to extract the audio video program and to couple the audio video program to the processor 220. In an exemplary embodiment, the audio/video decoder 210 may be further operative to couple the audio video signal to an audio/video output for presentation on the video display 225 and speaker 227 or the like.

The processor 220 may be operative to receive the audio video signal from the audio/video input 205 and/or the audio/video decoder 210. The processor 220 may then be operative to optionally further process the audio video program and to couple the audio video program the speaker 227 and/or the display 225. The processor may be further operative to receive a request from the user input 230 requesting a character name change be performed. The request for the character name change may include an original character name and an alternate character name where the user directs that the original character name be replaced with the alternate character name in the audio stream of the audio video program.

In response to receiving the request for the character name change, the processor 220 may be operative to buffer the audio video signal within the memory 240 or other buffering means to generate a delayed audio video signal. The processor 220 may then be operative to monitor the original, undelayed audio video program for occurrences of the original character name. The processor 220 may detect the original character name by monitoring the audio portion of the audio video program using speech recognition algorithms. Alternatively, or in addition, the processor 220 may monitor the closed captioning information associated with the audio video program to detect the original character name in the undelayed audio video program. Alternatively, the processor 220 may receive meta data with the audio video program or may retrieve the metadata via the network interface 215 from a network data server or the like wherein the metadata is indicative of character name within the audio video program and times of utterances of character names within the audio video program. The processor 220 may be operative to use any combination of these methods and data to detect the utterance of the original character name within the audio video program.

Once the processor 220 has detected an utterance of the audio video program, the processor 220 may be further be operative to replace audio of the audio video program voicing the original character name with audio voicing the alternate character name in the delayed audio stream to generate a modified delayed audio stream. This audio voicing the alternate character name may be computer generated, may be an audio data stored within the memory 240 corresponding to the alternative character name, or may be an altered or unaltered voice recording of the user requesting the alternate character name via a microphone and the user interface 230. For example, the user may initiate a voice request wherein the user speaks the original character name and the alternate character name. The processor 220 may then receive sound data files indicative of the original character name and the alternate character name. The processor 220 may then use the sound data file of the original character name to perform a cross correlation operation with the undelayed audio stream of the audio video program to detect an occurrence of the original character name. The processor 220 may then further be operative to replace the detected original character name in the delayed audio stream with the sound data file indicative of the alternate character name. Advantageously, in this embodiment, the pronunciation of the alternate character name requested by the user will be the pronunciation of the alternate character name when played back with the delayed audio video program. The processor 220 is further operative to couple the modified delayed audio stream to the speaker 227 and the display 225 for presentation to the user.

The network interface 230 is operative to transmit and receive data from client devices on a network. For example, the network interface 230 may be part of a DVR and is operative to receive requests from one or more client devices on a network. The network interface 230 is then operative to transmit a list of available programs, a requested program, a thumbnail data file, or other information to a client device in response to a request from the client device. The network interface 230 may communicate directly with the client device or may communicate via a network router on a wireless local area network, such as a Wi-Fi network.

Figure 3:
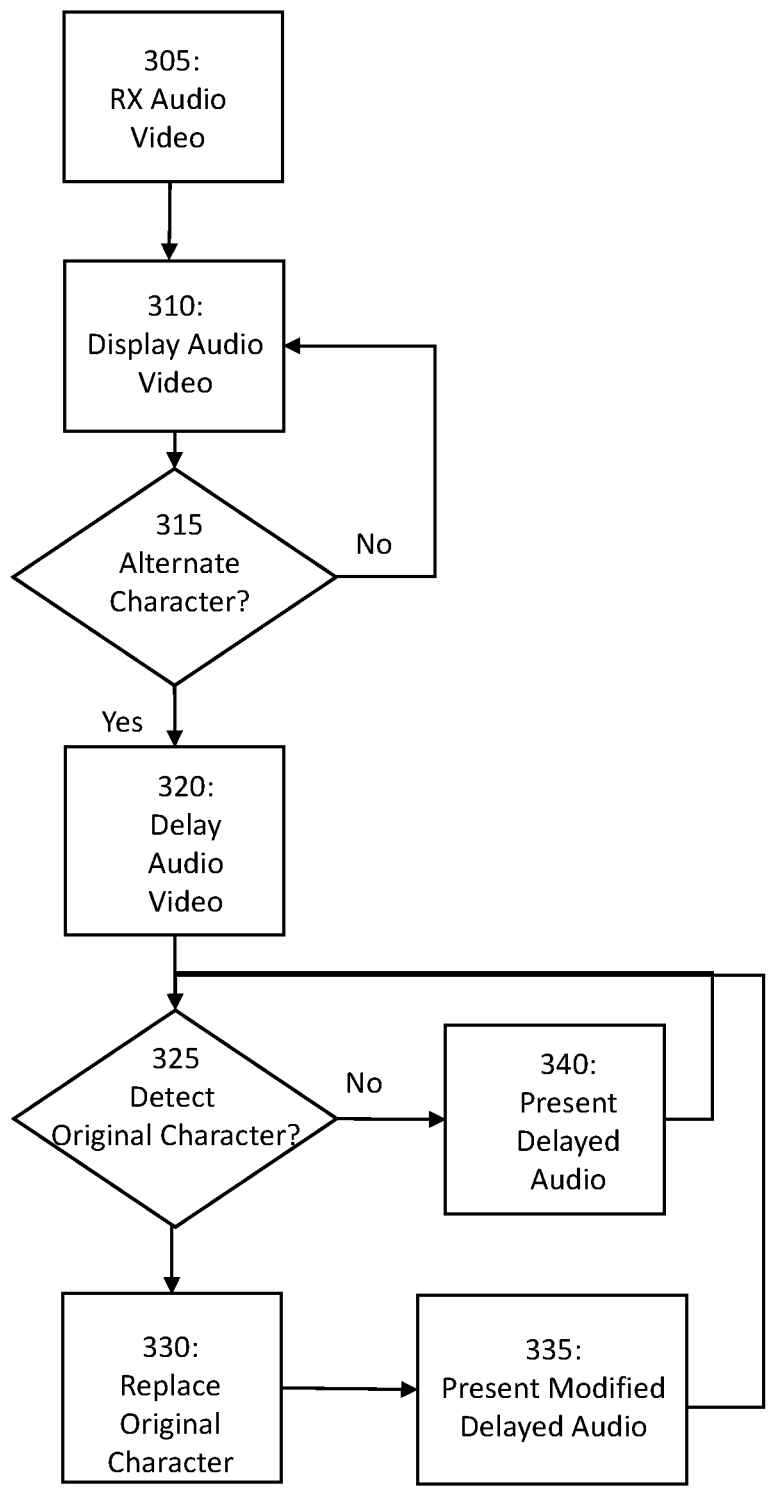
FIG. 3 shows a flowchart illustrating a method for interactive reassignment of character names for a video device according to an exemplary embodiment of the present disclosure.

Turning now to FIG. 3, a method 300 for interactive reassignment of character names in a video device according to an exemplary embodiment of the present disclosure is shown. The method is first operative to receive 305 an audio video program via an antenna, video input, network interface or the like. The audio video program may be converted from a first transport format, such as ATSC to a second format suitable for display, such as baseband audio video or the like.

The method is next operative to display 310 the audio video program on a video display and audio loudspeakers. At this point, the audio video program is normally displayed and is not buffered by a character name substitution algorithm or the like. The display may be a video display, such as an LCD display wherein the processor performing the method is integral to an electronic device including the video display, such as a television, smartphone, or the like. Alternatively, the display may be a video output for coupling a baseband or similar signal to a display device such as a computer monitor. In this exemplary embodiment, the method may be performed by a processor integral to a set top box or computer and wherein the video signal is coupled from the set top box to the computer monitor or the like via a cable or wireless connection.

The method is next operative to determine 315 if a request for character name substitution has been received. The request may include the alternate character name selected by a user, the original name to be replaced in the audio video program and may further include the time during the program after which the character name will be substituted and may further include a stop time after which the character name substitution will cease. If no request is received, the method is operative to continue to display 310 the audio video program. If a request has been received, the method is next operative to delay 320 the audio video program for a predetermined time duration. The time duration may be determined in response to device design characteristics, such as processor speed, available memory and the like and should be long enough to perform the character name substitution function on the audio video program. In one exemplary embodiment, a memory buffer or the like may be used as first in-first out (FIFO) buffer to delay the video.

The method is next operative to monitor the undelayed, or original, audio video stream in order to detect 325 occurrences of the original name in the undelayed audio stream. These detections 325 of the original name may be performed by monitoring the closed captioning information associated with the undelayed audio video program, may be detected by a voice recognition algorithm, cross correlation using a previously saved audio example of the original name, or cross correlation with an audio same of the original name provided by the viewer. For example, in one embodiment of the graphical user interface, the user may be prompted to speak the original name to be replaced. The system may then save a recording of the original name to a memory and use this recording to search the audio stream for occurrences of the original name. If no occurrence of the original name is detected, the method is operative to present 340 the delayed audio video program for display to the user and continue to search 325 the undelayed audio stream for occurrences of the original name.

If an occurrence of the original name is detected 325 in the undelayed audio stream, the method is next operative to replace 330 the original name in the delayed audio stream with the alternate name as indicated by the user. In one exemplary embodiment, the original name in the delayed audio stream may be replaced with a computer generated audio version of the alternate name wherein the computer generated audio version of the alternate name is generated such that it has a similar time duration to the audio version of the original name. In another embodiment, a range of frequencies of the voice speaking the original name may be determined in response to an audio analysis of the original name or a spoken phrase including the original name. A computer generated audio version of the alternate name may then be generated within the range of frequencies, thereby maintaining the range of frequencies for the spoken phrase and being less disruptive or distracting to the viewer of the audio video program.

In one exemplary embodiment, when the original name is detected within the undelayed audio stream, a time indicator from the audio video program is retrieved to determine the start and end time of the original name within the audio stream. This start and end time may then be used to replace the original name in the delayed audio stream with the alternate name. In addition, this start and start time may be used to determine a duration of the original name in order to guide the audio generation of the alternate name. For example, the pronunciation of the alternate name may be slowed down or sped up to match the original time duration of the original name in the audio video program in order to maintain synchronization between the audio stream and video stream of the audio video program.

Once the original name is replaced by the alternate name in the delayed audio stream to generate a modified delayed audio stream, the modified delayed audio stream is then presented 335 to the audio video program viewer and/or user. The method is then operative to return to detecting the original name in the undelayed audio stream of the audio video program.

Figure 4:
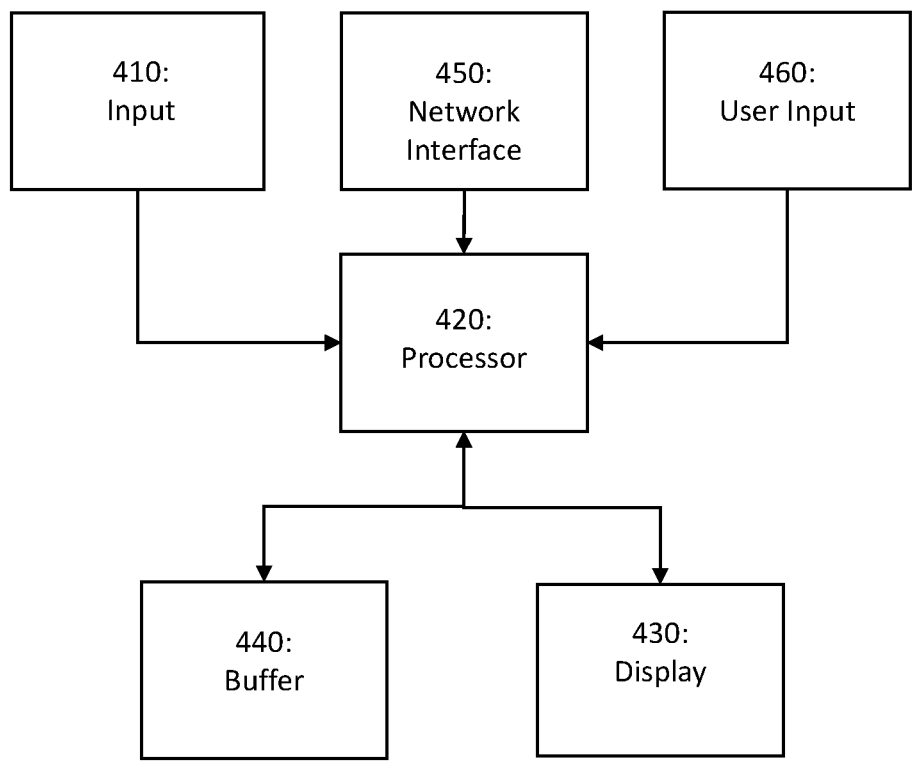
FIG. 4 shows a block diagram illustrating a system for interactive reassignment of character names according to another exemplary embodiment of the present disclosure.

Turning now to FIG. 4, a system 400 for interactive reassignment of character names in an audio reproducing device according to an exemplary embodiment of the present disclosure is shown.

The exemplary system may include an input 410 configured to receive an audio video program. The audio video program may include a video portion and an audio portion. In one exemplary embodiment, the audio video program may include metadata related to a character associated with the audio video program. In this exemplary embodiment, the processor may be configured to detect the utterance of the original character name in response to the metadata associated with the audio video program. In another exemplary embodiment, the audio video program may include a closed captioning information and wherein the utterance of the original character name is detected in response to the closed captioning. In one exemplary embodiment, the input 410 may be a tuner configured for receiving a radio frequency or microwave signal and demodulating the signal to extract the audio video program.

The exemplary system may further include a display device 430 configured to display a video portion of the audio video program and a speaker to play an audio portion of the audio video program. In one exemplary embodiment, the display device 430 is a television having an integral LCD display and multiple speakers for recreating the audio video program for a viewer.

The buffer 440 may be operative for generating a delayed audio video program in response the audio video program. In one example, the buffer 440 is a memory configured to store a portion of the audio video program for a duration of time before it is coupled to a display device or overwritten in the memory. In an exemplary embodiment, the system 400 is operative to buffer the audio video program to generate a delayed audio video program while performing speech recognition algorithms on the undelayed audio video program.

The system 400 may further include a processor 420, such as a microprocessor or digital signal processor, operative to receive a request to substitute an original character name in the audio video program with an alternative character name. The processor 420 may be further operative to detect an utterance of the original character name within the audio video program and to replace the original character name in the delayed audio video program with the alternative character name to generate a modified delayed audio video program. The processor 420 may then be further operative for coupling the modified delayed audio video program to the display device 430. In an exemplary embodiment, the processor 420 may be further operative to generate a graphical user interface having a list of character names associated with the audio video program and an input for receiving an alternate character name in response to a user input. The processor 420 may be configured to detect the utterance of the original character name in response to a closed captioning information associated with the audio video program. In another exemplary embodiment, the processor 420 may be operative to detect the utterance of the original character name within the audio video program in response to a speech recognition algorithm.

A network interface 450 may be operative for receiving a metadata associated with the audio video program. For example, the network interface 450 may be a wireless network interface for accessing a wireless local area network and the internet. The network interface 450 may be a wired connection to a local area network with access to the internet. A request for metadata may be generated by the processor 420 and transmitted to a remote server or the like via the network interface 450.

The exemplary system may further include a user input 460 for receiving a user indication of the original character name and an alternative character name. The user input 460 may include a microphone for receiving a user indication of the original character name and an alternative character name. In one exemplary embodiment, the user input 460 may be a microphone. In another exemplary embodiment, the user input 460 may be a computer keyboard, computer mouse, and/or remote control.

Figure 5:
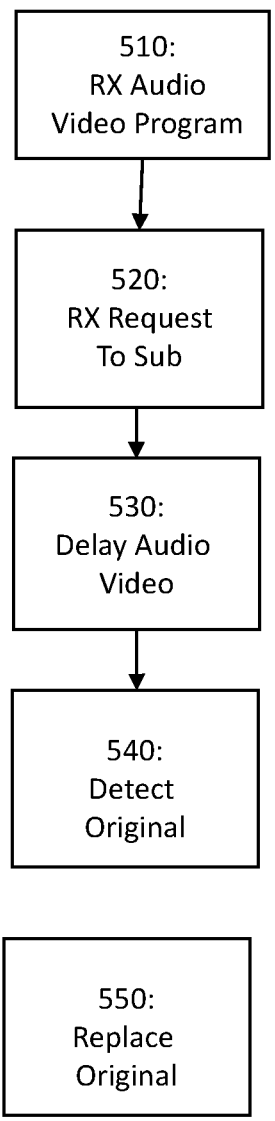
FIG. 5 shows a flowchart illustrating a method for interactive reassignment of character names according to another exemplary embodiment of the present disclosure.

Turning now to FIG. 5, a method 500 for interactive reassignment of character names in an audio reproducing device according to an exemplary embodiment of the present disclosure is shown. The method is first operative for receiving 510 an audio video program. The audio video program may include an audio portion, such as a sound track, and a video portion such as a stream of chronologically ordered video images. The audio video program may further include closed captioning information related to audio portion, metadata related to the audio video programming such as character information, current character information corresponding to characters within a scene within the audio video program at a particular time, and/or synchronization data to synchronize the audio portion, video portion, metadata, etc.

The method is next operative for receiving 520 a request to substitute an original character name within the audio video program with an alternative character name. In one exemplary embodiment, the request to substitute an original character name within the audio video program with the alternative character name may be generated in response to a user request generated via a user interface. Alternatively, the request to substitute the original character name within the audio video program with the alternative character name may generated in response to a user utterance of the original character name and the alternative character name, such as a voice command from the user received via a microphone. In this exemplary embodiment, the user utterance of the original character name may be used to detect the original character name in the audio video program and the user utterance of the alternative character name may be used to replace an audio of the original character name in the delayed audio video program. Alternatively, the request to substitute the original character name within the audio video program with the alternative character name may be received in response to a user selection using a user input device, such as a remote control, in a graphical user interface, such as a menu system, displayed on the display.

The method is next operative to delay 530 the audio video program to generate a delayed audio video program. The delayed audio video program may be generated in response to buffering the audio video program in a buffer memory or the like. The time delay applied to the delayed audio video program may be selected in response to the time required by the exemplary system to detect an utterance of the original character name in the audio video program and to replace the original character name in the delayed audio video program with an alternate character name.

The method is then operative for detecting 540 an utterance of the original character name within the audio video program. The detecting an utterance of the original character name may include determining a program time location corresponding to the utterance of the original character name in the audio video program. The program time location may be used replace the original character name in the delayed audio video program with the alternate character name.

In response to detecting an utterance of the original character name within the audio video program the method is next operative for replacing 550 the utterance of the original character name in the delayed audio video program with an utterance of the alternative character name to generate a modified delayed audio video program. In one example, the utterance of the original character name is detected in response to a speech recognition algorithm. In addition, replacing the utterance of the original character name in the delayed audio video program with the utterance of the alternative character name may include adjusting a time duration of the alternative character name to match a time duration of the original character name. In another exemplary embodiment, the utterance of the alternative character name may be computer generated in response to a text user input indicative of the alternative character name.

The term "exemplary" is used herein to represent one example, instance or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the disclosure in any way. To the contrary, various changes may be made in the function and arrangement of the various features described herein without departing from the scope of the claims and their legal equivalents.

The invention claimed is:

1. A method comprising:
   receiving an original audio video program;
   receiving a request to substitute an original character name within the original audio video program with an alternative character name;
   delaying the original audio video program to generate a delayed audio video program having a time delay from the original audio video program;
   detecting an utterance of the original character name within the original audio video program while displaying the delayed audio video program;
   determining an utterance time and a first duration of the utterance of the original character name in the original audio video program;
   determining a first audio frequency range of the utterance of the original character name;
   generating an utterance of the alternative character name having a second audio frequency range that matches the first audio frequency range and having a second duration that matches the first duration;
   replacing the utterance of the original character name at the utterance time in the delayed audio video program with the utterance of the alternative character name in real time to generate a modified delayed audio video program having the time delay from the original audio video program; and
   coupling the modified delayed audio video program to a display and loudspeaker.

2. The method of claim 1 wherein the utterance of the alternative character name is computer generated in response to a text user input indicative of the alternative character name.

3. The method of claim 1 where the request to substitute an original character name within the original audio video program with the alternative character name is generated in response to a user request generated via a user interface.

4. The method of claim 1 wherein generating an utterance of the alternative character name further comprises adjusting the second audio frequency range of the utterance of the alternate character name to match the first audio frequency range of the utterance of the original character name.

5. The method of claim 1, wherein the request to substitute an original character name within the original audio video program with the alternative character name is generated in response to a user utterance of the original character name and the alternative character name,
   wherein the user utterance of the original character name is used to detect the original character name in the original audio video program, and
   wherein the user utterance of the alternative character name is used to replace an audio of the original character name in the delayed audio video program.

6. The method of claim 1, wherein detecting an utterance of the original character name further includes determining a program time location corresponding to the utterance of the original character name in the original audio video program, and
   wherein the program time location is used replace the original character name in the delayed audio video program with the alternate character name.

7. The method of claim 1 wherein the request to substitute the original character name within the original audio video program with the alternative character name is received in response to a user selection in a graphical user interface displayed on the display.

8. The method of claim 1 wherein replacing the utterance of the original character name in the delayed audio video program with the utterance of the alternative character name includes adjusting a pronunciation of the alternative character name to match the first duration of the original character name.

9. An apparatus comprising:
   an input configured to receive an original audio video program;
   a buffer for generating a delayed audio video program having a time delay from the original audio video program; and
   a processor operative to receive a request to substitute an original character name in the original audio video program with an alternative character name, the processor being further operative:
   to detect an utterance of the original character name at an utterance time within the original audio video program during playback of the delayed audio video program on a display and a speaker,
   to determine a first duration of the utterance of the original character name in the original audio video program,
   to determine a first audio frequency range of the utterance of the original character name in the original audio video program,
   to generate an utterance of the alternate character name having a second audio frequency range that matches the first audio frequency range and having a second duration that matches the first duration, and
   to replace the utterance of the original character name in the delayed audio video program stored in the buffer with the utterance of the alternative character name to generate a modified delayed audio video program having the time delay from the original audio video program, and
   to playback the modified delayed audio video program on the display and the speaker.

10. The apparatus of claim 9 further including a network interface for receiving a metadata associated with the original audio video program.

11. The apparatus of claim 9 wherein the buffer is a memory configured to store a portion of the delayed audio video program.

12. The apparatus of claim 9 further including a user input for receiving a user indication of the original character name and an alternative character name.

13. The apparatus of claim 9 wherein the processor is further operative to generate a graphical user interface having a list of character names associated with the original audio video program and an input for receiving an alternate character name in response to a user input.

14. The apparatus of claim 9 further including a microphone for receiving a user indication of the original character name and an alternative character name.

15. The apparatus of claim 9 wherein the processor is configured to detect the utterance of the original character name in response to a closed captioning information associated with the original audio video program.

16. The apparatus of claim 9 wherein, the original audio video program further includes metadata related to a character associated with the original audio video program, and wherein the processor is configured to detect the utterance of the original character name in response to the metadata associated with the original audio video program.

17. The apparatus of claim 9 wherein the utterance of the original character name is detected in response to a speech recognition algorithm.

18. The apparatus of claim 9, wherein the original audio video program further includes a closed captioning information, and
wherein the utterance of the original character name is detected in response to the closed captioning information.

19. An apparatus for interactive reassignment of character names in an audio video program, comprising:
a tuner configured for receiving and demodulating a video signal to extract an original audio video program;
a user input operative to receive a user request to substitute an original character name within the original audio video program with an alternative character name;
a memory configured to buffer a copy of the original audio video program to generate a delayed audio video program having a time delay from the original audio video program;
a processor configured to perform operations comprising:
detecting an utterance of the original character name within the original audio video program at an utterance time,
determining a first duration of the utterance of the original character name in the original audio video program,
determining a first audio frequency range of the utterance of the original character name in the original audio video program,
generating an utterance of the alternative character name having a second audio frequency range that matches the first audio frequency range and having a second duration that matches the first duration, and
replacing the utterance of the original character name with the utterance of the alternative character name within the delayed audio video program to generate a modified audio video program having the time delay from the original audio video program; and
a loudspeaker configured to reproduce the utterance of the alternative character name in response to playback of the modified delayed audio video program.

20. The apparatus for interactive reassignment of character names in an audio video program of claim 19 wherein the operations further comprise detecting the original character name in response to metadata received with the video signal.

* * * * *